UNITED STATES PATENT OFFICE.

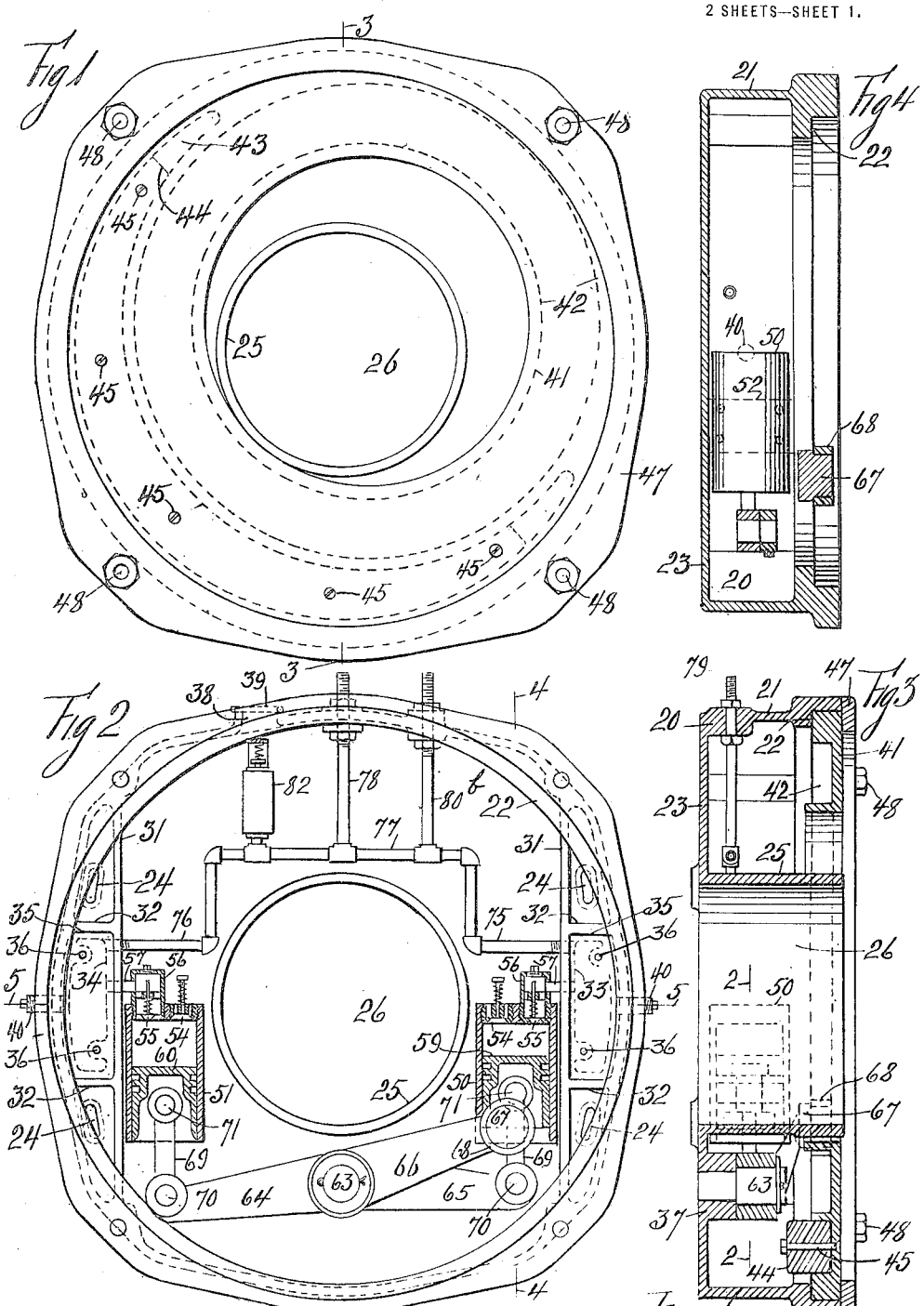

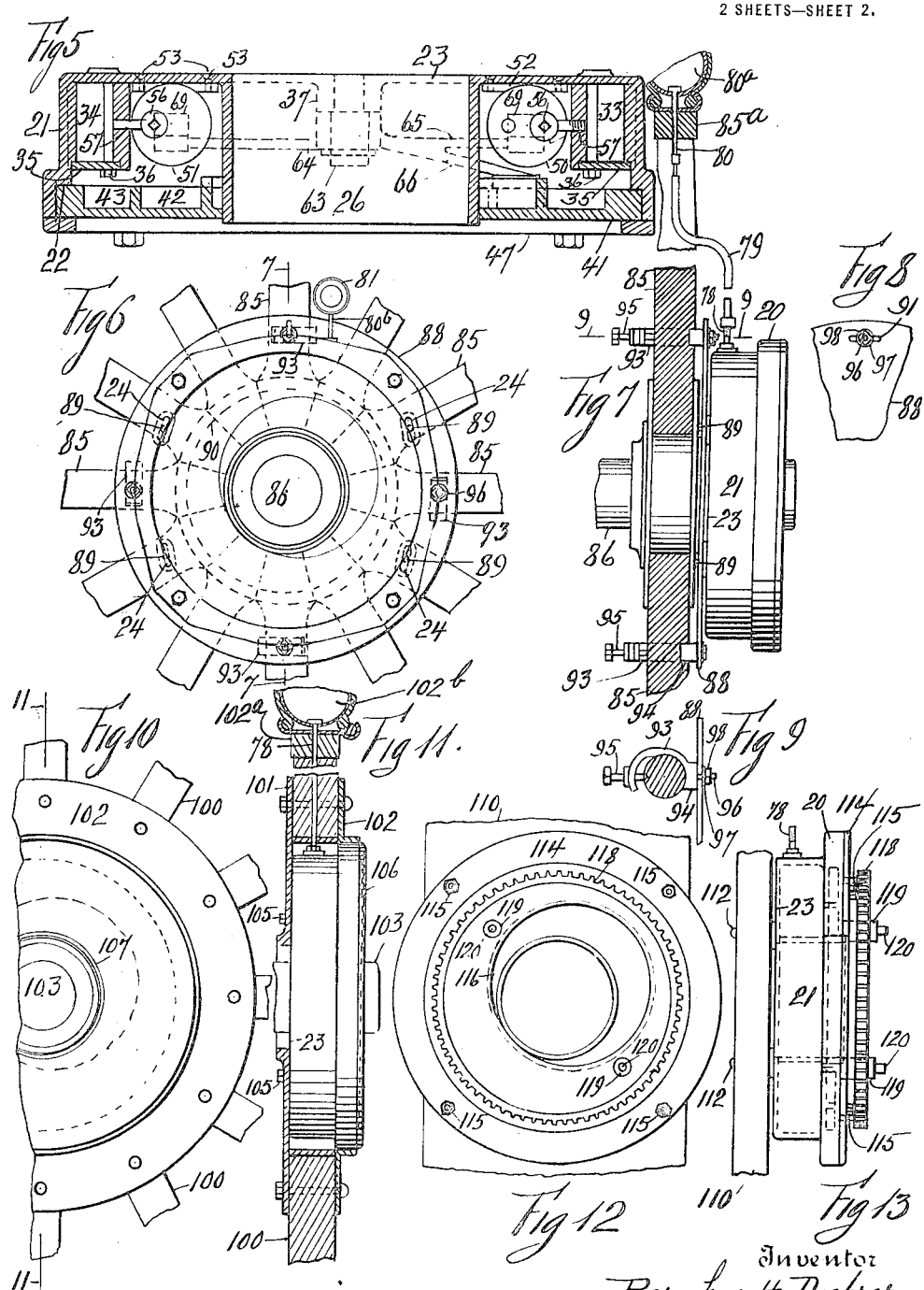

BERNHARDT DOEHRER, OF BRIDGEPORT, CONNECTICUT.

AUTOMATIC TIRE-PUMP.

1,335,562.  Specification of Letters Patent.  Patented Mar. 30, 1920.

Application filed July 3, 1918. Serial No. 243,177.

*To all whom it may concern:*

Be it known that I, BERNHARDT DOEHRER, a citizen of the United States, and resident of Bridgeport, in the county of Fairfield and State of Connecticut, have invented certain new and useful Improvements in Automatic Tire-Pumps, of which the following is a specification.

This invention relates to an automatic tire pump for vehicles and for other purposes.

The organization of the invention comprises a casing that can be secured to a wheel for a vehicle and which rotates therewith. Within the casing are fastened a pair of compressor cylinders. A counterweighted cam disk is slidably supported in the casing and a walking beam oscillating, by coacting with the cam disk provides means for operating the cylinders to produce compressed air. By this means the tube of the tire of the wheel is supplied with compressed air when the wheel is turning. At a predetermined pressure the compressors stop operating and the appurtenances produce an automatic tire pump for inflating the tubes of tires.

In the accompanying drawings which exemplify the invention, Figure 1 represents a front view of the tire pump casing; Fig. 2 shows a view similar to Fig. 1 with some of the parts removed and a partial section of Fig. 3 on the line 2, 2; Fig. 3 is a partial section of Fig. 1 on the line 3, 3; Fig. 4 represents a partial section of Fig. 2 on the line 4, 4; Fig. 5 shows a partial section of Fig. 2 on the line 5, 5; Fig. 6 shows a front view of the tire pump connected to a wheel of a vehicle; Fig. 7 represents a left hand side view and partial section of Fig. 6 on the line 7, 7, and a fragmentary portion of the tire of the wheel with its tube; Fig. 8 is a fragmentary portion of Fig. 6; Fig. 9 shows a partial section of Fig. 7 on the line 9, 9; Fig. 10 shows a front view of a fragmentary portion of a wheel of a vehicle with the pump located therein; Fig. 11 shows a partial section of Fig. 10 on the line 11, 11 with a fragmentary portion of the tire of the wheel with its tube; Fig. 12 represents a front view of a modification of the pump secured to a stationary support and Fig. 13 shows a left hand side view of Fig. 12.

The pump comprises the cup shaped casing 20, having the cylindrical side wall 21 with the annular flange 22 at its open end and the bottom wall 23 with the elongated openings 24. A cylindrical central wall 25 extends from the bottom wall 23 and forms the cylindrical central opening 26.

Walls 31 and 32 extend from the cylindrical wall 21 and form the air reservoirs 33 and 34. A cover 35 is provided for each of the air reservoirs and is held in place by the bolts 36. A boss 37 is formed with the bottom wall 23 and an opening 38 with the cover 39 is formed with the side wall 21. Screw plugs 40 are provided for threaded openings in the side wall 21. A cam disk 41 is rotatably supported on the annular flange 22, and has formed therewith the cam groove 42, eccentric with the cylindrical wall 25. A counter weight groove 43 in the cam disk 41 has fastened therein the counterweight 44 with the bolts 45. The counter weight groove 43 is formed to bring its central portion diametrically opposite that portion of the cam groove 42 which is the greatest distance from the center of the central opening 26. An annular cover 47 is fastened to the open end of the casing 20 by means of the bolts 48. The cover 47 maintains the cam disk 41 in place on the annular flange 22. A pair of compressor cylinders are indicated at 50 and 51, each having a foot 52, these feet being secured to the bottom wall 23 by means of screws 53. At the closed end of each of the cylinders is located a spring controlled inlet valve 54 and a spring controlled outlet valve 55. The latter operate in the valve chambers 56. Pipes 57 connect the valve chambers 56 with the air reservoirs 33 and 34. In the cylinders 50 and 51 respectively reciprocate the similar pistons 59 and 60. In the boss 37 is secured the pivot pin 63 on which is supported the walking beam having the single arm 64 on one side and the pair of arms 65 and 66 on the other side. The arm 66 terminates in a boss 67 on which is rotatably supported the roller 68. The roller 68 engages the cam groove 42. At the ends of each of the arms 64 and 65 is pinned one end of a connecting rod 69 by means of the pins 70. The other ends of the connecting rods are pinned to the pistons 59 and 60 by means of the pins 71. From the air reservoir 33 leads the piping 75 and from the air reservoir 34 leads the piping 76. Piping 77 connects the piping 75 and 76. Piping 78 leads from the piping 77 and to which is connected one end of the tube 79 that leads to the charging pipe 80 of the inner tube 80ᵃ of the tire. Piping 80^b leads from the piping 77 and to which is connected a pressure gage 81. A safety valve 82 also is connected with piping 77.

Referring particularly to Figs. 6, 7, 8 and 9, the spokes of a vehicle are indicated at 85 with the felly 85^a and an axle 86. To the bottom wall 23 of the casing 20 is bolted the annular plate 88 by means of the bolts 89. The plate 88 has a central opening 90 to enable it to clear the hub of the wheel of the vehicle and has also formed therein the elongated openings 91. On four of the spokes 85 is fastened a clamping bracket 93 which has formed at one end thereof a bearing block 94 and through the other end extends a clamping screw 95 by means of which latter the bracket 93 is fastened to the spoke. From each block 94 extends a stud 96. A washer 97 encircles each stud 96 and a nut 98 clamps the plate 88 to the block 94.

In Figs. 10, 11 and 12 the tire pump is incorporated in the axial center of the wheel having the spokes 100. The latter are secured between the annular plates 101, and 102 that constitutes a portion of the hub of the wheel having the felly 102^a and the axle 103. The piping 78 extends from the cylindrical side wall 21 of the tire pump through one of the spokes 100 and the felly 102^a to the tube 102^b of the tire. The bottom wall 23 is bolted to the plate 101 by means of the bolts 105. The cover for the casing 20 shown at 106 has the central opening 107 and covers the cam disk 41.

In Figs. 12 and 13 the pump is adapted to be used with a stationary support which latter is indicated at 110. The bottom wall 23 of the casing 20 is bolted to the support 110 by means of the bolts 112. The annular cover 114 for the casing 20 is secured in place by means of the bolts 115. The cam disk is indicated at 116 and has extending therefrom the spur gear 118, by means of which the cam disk can be turned. Lugs 119 with the projecting pins 120 extend from the cam disk 116 by means of which the cam disk 116 can also be turned.

To operate the pump and referring particularly to Figs. 1 to 9 inclusive when the wheel having the spokes 85 turns, the casing 20 with all of the other elements except the cam disk 41, also turns. The cam disk remains at rest for pressures below predetermined pressure of the air compressed in the cylinders 59 and 60 by reason of the effect of the weight of the counterweight 44 exceeding the friction between the cam disk 41, the annular flange 22, the annular cover 47, the roller 68 and the friction of the pistons 59 and 60 in their cylinders. During the rotations of the casing 20 the roller 68 travels in the cam groove 42 which causes the walking beam having the arms 64, 65 and 66 to oscillate. Thereby the pistons 59 and 60 through the intervention of the connecting rods 69 reciprocate. Air is drawn into the cylinders 50, 51 through the inlet valves 54 and discharged from said cylinders through the outlet valves 55 and forced into the valve chambers 56. The compressed air then flows through the pipes 57 into the reservoirs 33 and 34.

Piping 75, 76 and 77 lead the compressed air to the piping 78 and 80. The tube 79 conducts the air from the piping 78 to the inner tube 80^a of the tire to charge the same. The piping 80 conducts the air to the pressure gage 81 whereby the pressure of the air is at all times indicated. The safety valve 82 releases the pressure when it exceeds a predetermined amount. Also as soon as the predetermined amount of pressure is exceeded the pressure of the roller 68 on the sides of the cam groove 42 exceeds the effect of the counterweight 44 and the cam disk 41 turns with the casing 20, the pistons 59 and 60 stop reciprocating and the pumping of air is stopped.

The predetermined pressure at which the pumping of air is stopped can be varied by using counter weights of different sizes and weights.

The operation of the modification shown in Figs. 10 and 11 is similar to that described. In the modification shown in Figs. 12 and 13 the casing 20 remains stationary and the disk cam 116 is turned by rotating the spur gear 118 with a rotating gear not shown, or said disk cam is turned by applying an operating handle to the pins 120.

Having described my invention what I desire to secure by Letters Patent and claim is:

1. In a pump the combination of a compressor cylinder, a piston in the cylinder, means to revolve the cylinder, a pair of arms simultaneously revolving with the cylinder, a normally stationary cam disk oscillating one of said arms during the revolutions of the cylinder and a connecting rod connecting the other arm and said piston, thereby reciprocating the latter, and piping to lead compressed air from the cylinder to the tube of a tire.

2. In a pump the combination of a casing, means to connect the casing to a rotating element, a pair of compressor cylinders in the casing and fastened thereto, a piston in each cylinder, a walking beam having three arms pivoted in the casing, a connecting rod for each piston and with one end pinned thereto, the other end of each connecting rod pinned to one of a pair of said arms, a normally stationary cam disk having a cam groove supported in the casing, a roller carried by the third arm of said walking beam engaged by said cam groove and piping for the outlet ends of the compressor cylinders to lead compressed air from said cylinders.

3. In a pump the combination of a casing having a central opening to admit the hub of a vehicle therethrough, means to clamp the casing to a wheel of the vehicle, a pair of compressor cylinders in the casing and fastened thereto, a piston in each cylinder, a normally counterweighted cam disk having a groove slidably supported in the casing, a walking beam pivoted in the casing, connections between the walking beam and the groove to oscillate the beam and connections between the walking beam and the pistons to reciprocate the latter during the oscillations of the walking beam.

4. In a pump the combination of a casing having a central opening, means to secure the casing to a vehicle, a pair of compressor cylinders in the casing and fastened thereto, a piston in each cylinder, a walking beam with three arms pivoted in the casing, connecting rods connecting the pistons and a pair of said arms, a cam disk having a cam groove slidably supported on an annular flange of the casing, a counterweight for the cam disk, a roller pivoted on the third arm of the walking beam and engaged by said cam groove, a pair of air reservoirs in the casing, a pipe leading from each compressor cylinder to one of said reservoirs and piping leading from the reservoirs to the tube of a tire.

5. In a pump the combination of a casing having a central opening to allow the insertion of the hub of a wheel of a vehicle, a pair of compressor cylinders in the casing and revolving therewith, a piston in each cylinder, a counterweighted cam disk having a cam groove slidably supported in the casing, a walking beam pivoted in the casing, connections between the walking beam and cam disk, connections between the walking beam and the pistons, a plate bolted to the outside of the casing and brackets connecting said plate and said wheel.

Signed at borough of Manhattan, city of New York, in the county of New York and State of New York, this 27th day of June, A. D. 1918.

BERNHARDT DOEHRER.

Witnesses:
A. A. DE BONNEVILLE,
JACK NILE.